INVENTORS:
WINTON J. PELIZZONI
BERNARD UCKO
FRANK J. PEKAR, JR.

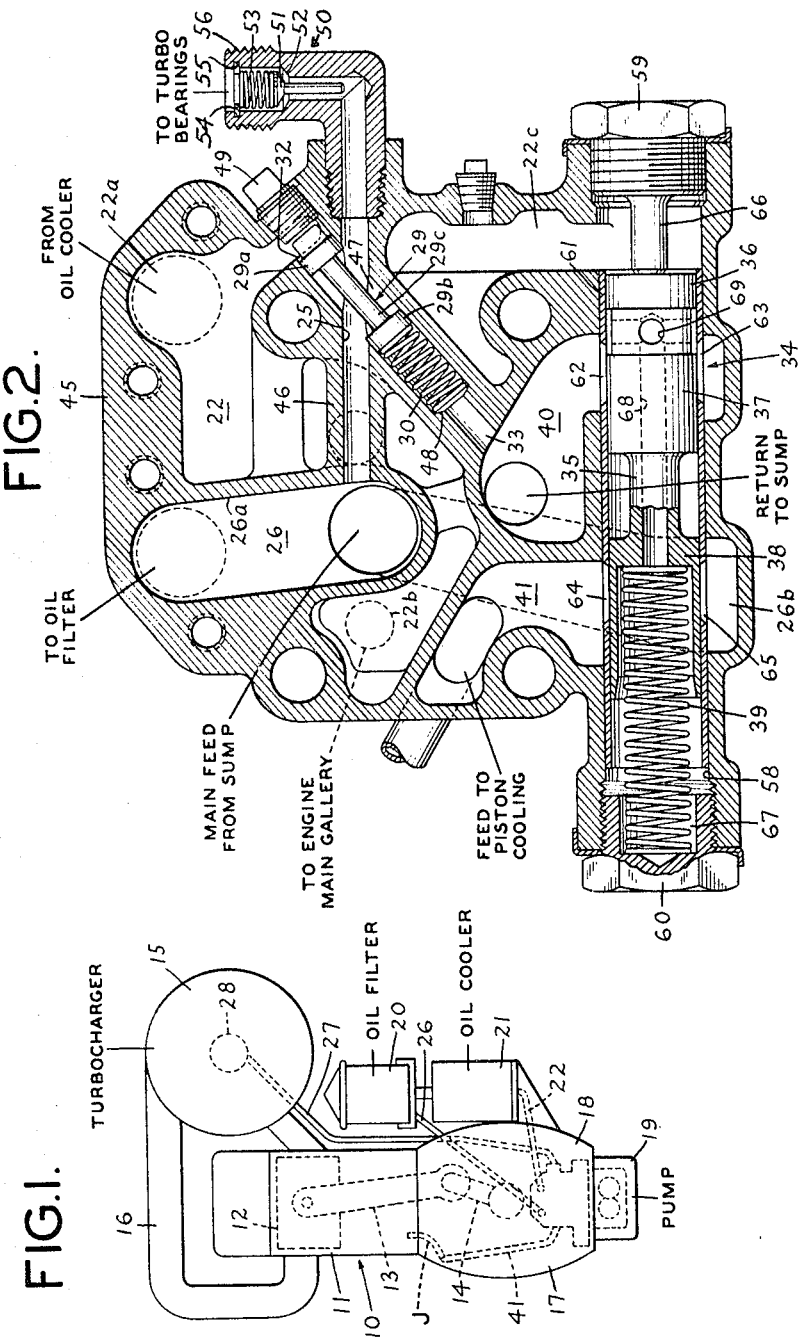

THEIR ATTORNEYS

United States Patent Office 3,453,995
Patented July 8, 1969

3,453,995
PISTON COOLING AND LUBRICATION SYSTEM
Winton J. Pelizzoni, Bernard Ucko, and Frank J. Pekar, Jr., Hagerstown, Md., assignors to Mack Trucks, Inc., Montvale, N.J., a corporation of New York
Filed June 11, 1965, Ser. No. 463,247
Int. Cl. F01m 1/02
U.S. Cl. 123—196    5 Claims

ABSTRACT OF THE DISCLOSURE

An improvement in lubricating and piston cooling systems for internal combustion engines in which oil is supplied from a sump in the crankcase of the engine by means of a pump either through an oil filter or directly from the pump to the oil gallery of the engine for lubricating engine bearings or the bearings of accessories, such as turbochargers, depending upon the pressure of the oil developed in the gallery and including jets for directing oil against the pistons of the engine to cool the pistons under the control of a valve which is also responsive to the pressure of the oil in the oil gallery to thereby delay flow of oil to the jets until a predetermined oil pressure is attained in the gallery and to return oil to the sump from the gallery when the pressure of the oil in the gallery exceeds a predetermined maximum.

---

This invention relates to lubricating systems for internal combustion engines and it relates particularly to systems by means of which lubricant can be supplied to turbochargers, superchargers and other components of internal combustion engines and for cooling the pistons of such internal combustion engines and especially the pistons of compression-ignition engines.

It has been recognized heretofore that internal combustion engines which are provided with oil filters for lubricants, have presented some problems when the cold engine is first started. The oil filter, together with the relatively high viscosity of the cold oil, prevents an adequate amount of oil from flowing to the main engine lubricating gallery and to such components as the supercharger or turbocharger bearings, connecting rod bearings and the like so that these bearings become starved for oil and sometimes are burned out or damaged. For that reason, others have suggested the use of a bypass containing a normally open pressure-responsive valve to enable unfiltered oil to be supplied to selected bearings such as the supercharger or turbocharger bearings until a sufficient flow of oil through the filter occurs to close the pressure-responsive bypass valve, and thereby shut off the flow of unfiltered oil and direct filtered oil to the turbocharger or supercharger bearings and the main lubricating system oil gallery of the engine. Also, it has been proposed heretofore to provide means for supplying oil to piston-cooling jets which direct the oil against the insides of the pistons and particularly against the underside of the head of the pistons to keep the pistons relatively cool and thereby avoid burning or other damage to the piston resulting from improper fuel mixtures, high compression and the like.

Usually the piston cooling oil is supplied to the jets as soon as the engine is started and cools the pistons and delays warming up of the engine unnecessarily.

In accordance with the present invention, a lubricating system is provided which is capable of supplying unfiltered lubricant to operating parts of an engine such as the engine bearings, the supercharger or turbocharger bearings, while the viscosity of the oil is such as to reduce its rate of flow through the oil filter and thereafter supplies filtered oil to the engine components and unfiltered lubricant to the piston cooling jets when the pistons and the engine have warmed up substantially. More particularly, the lubricating system is constructed and arranged so that flow of oil for cooling the pistons is delayed until oil is supplied through the oil filter to the engine main gallery at sufficient volume and pressure to lubricate the operating engine components.

More particularly, the new lubricating system embodying the invention includes a pressure-responsive valve which is normally closed to prevent flow of oil supplied by the pump to the piston cooling jets but is opened to allow oil to flow to the jets after a sufficient flow rate and pressure is established in the main engine oil gallery. The valve is also responsive to oil pressure in the gallery to discharge oil back to the sump of the engine to regulate the pressure in the oil system and the oil pressure of the oil supplied to the operating engine components.

With the system described above, it is possible to supply unfiltered oil to turbocharger bearings only or other engine components such as piston cooling jets which would be starved because of a low rate of flow of filtered oil through the oil filter, and after a sufficient rate of flow is established through the filter to supply only filtered oil to the engine and engine component bearings and at about the same time to admit oil to the piston cooling jets to thereby cool the pistons. In his way, a conrolled cycle of oil distribution is provided whereby the disadvantages of the prior systems are overcome.

For a better understanding of the present invention, reference may be had to the accompanying drawings, in which:

FIGURE 1 is a schematic front elevation of an engine provided with the new lubricating system and having a turbocharger for supplying air to the engine cylinders;

FIGURE 2 is a view in vertical cross-section through the novel oil and distribution system embodying the present invention.

Figure 3:
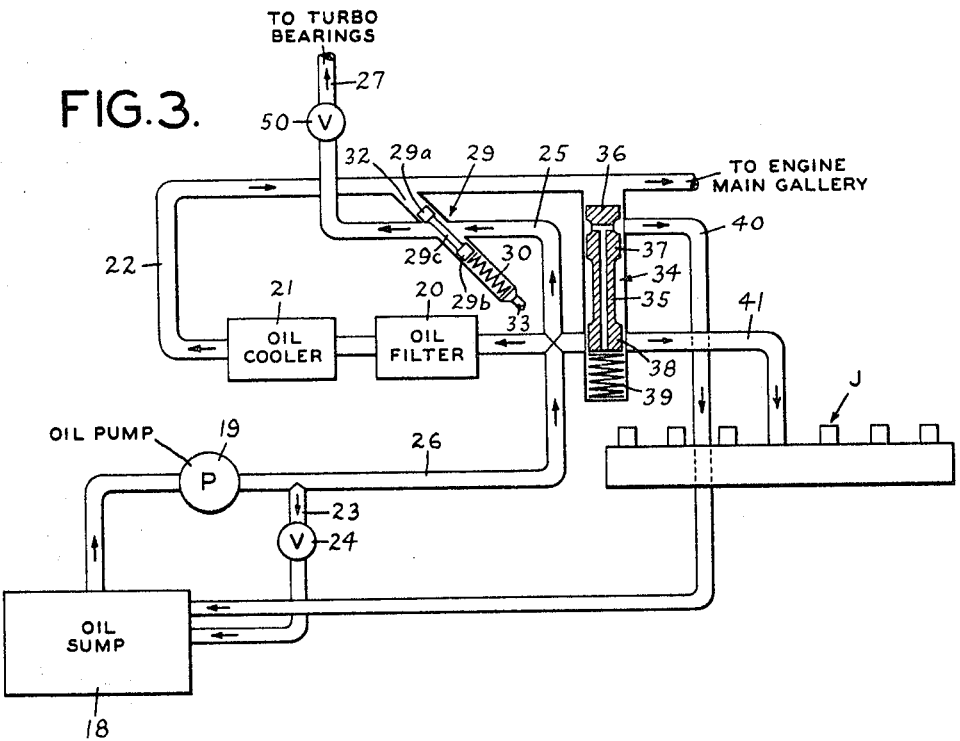
FIGURES 3, 4 and 5 are schematic illustrations of the lubrication system embodying the present invention shown in various stages of its operation.

Referring to FIGURE 1, the new lubricating system is applied to an internal combustion engine having a plurality of cylinders 11 each containing a piston 12 connected by means of a connecting rod 13 to a crank shaft 14 in the usual way. The engine can be either a spark-ignition type of engine or compression-ignition type of engine, and will be provided either with an appropriate carburetion and ignition system, not shown, or a fuel injection system, not shown. The engine is provided with a turbocharger 15 driven by exhaust gases for supplying air through the manifold 16 to the cylinders of the engine for combustion of fuel therein.

The crankcase 17 of the engine includes an oil sump 18 in its bottom portion from which oil is drawn by means of an engine driven pump 19 of any suitable type and supplied under pressure to an oil filter 20, an oil cooler 21 and to the various operating components of the engine through a passage 22 including or leading to the engine main gallery and suitable connecting branches leading to the crank shaft bearings, connecting rod bearings, etc. of the engine (not shown).

Referring now to FIGURES 2 to 5, a passage 23 connects the pressure side of the pump to the oil sump 18 and is provided with a pressure relief valve 24 by means of which excess oil is returned to the oil sump. All of the above components are conventional and are believed to require no further description herein.

Figure 4:
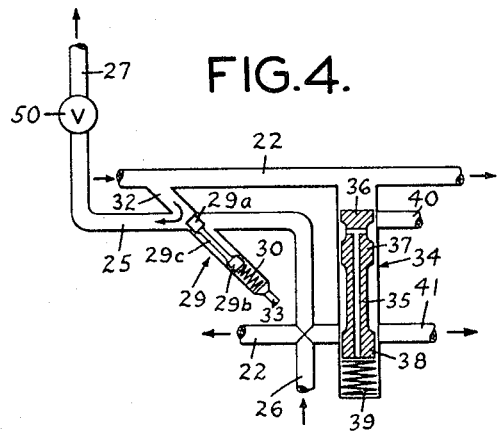

A passage or conduit 25 is connected with the conduit 26 leading from the pump 19 to the oil filter to bypass oil around the oil filter and oil cooler and supply oil through a conduit 27 to the turbocharger bearings 28 when the oil flow through the oil filter and cooler is low, as during the starting of a cold engine. A pressure-responsive shuttle valve 29 is disposed in the conduit 25, and is responsive to the pressure in the conduit 22, as illustrated in FIGURE 3. The shuttle valve 29 is normally retained in an open position by means of a spring 30 so that relatively unrestricted flow of unfiltered oil can take place from the pump directly to the turbocharger bearings. As best shown in FIGURES 2 and 3, the shuttle valve 29 has a pair of pistons 29a and 29b spaced apart on a reduced neck portion 29c so that in the open position of the shuttle valve, the piston portions 29a and 29b are disposed on opposite sides of the bypass conduit 25. However, the piston 29a is disposed in a branch 32 of the passage 22 leading to the engine main gallery and is responsive to oil pressure therein. As shown in FIGURES 2 and 3, when a sufficiently high pressure is attained in the passage 22, the shuttle valve is displaced downwardly causing the piston 29a to span and close the passage 25 and thereby prevent flow of unfiltered oil directly to the turbocharger, while at the same time, as shown in FIGURE 4, allowing oil to flow from the passage 22 through the branch 32 into the passage 25 to supply filtered oil to the turbocharger bearings.

In order to prevent oil leaking past the piston 29b from hampering movement of the valve 29, a vent passage 33 discharges oil into a return line to the sump 18.

If desired, another bypass can be provided around the filter 20 and cooler 21 to supply unfiltered oil to the connecting rod bearings through the engine main gallery. In this case, a bypass valve can be interposed between the passages 22 and 26.

In accordance with the present invention, a novel pressure-responsive valve 34 is provided for regulating oil pressure in the system and supplying oil to the piston cooling jets J in the crankcase 17, as shown in FIGURE 1. The valve 34, illustrated schematically in FIGURES 3, 4 and 5 includes a valve member or plug 35 having valve heads 36, 37 and 38 spaced apart along the length of the valve plug. The valve plug is normally biased by means of a spring 39 into the position shown in FIGURE 3 in which the valve head 36 prevents flow of oil from the passage 22 to a return conduit 40 for returning excess oil to the oil sump.

Figure 5:
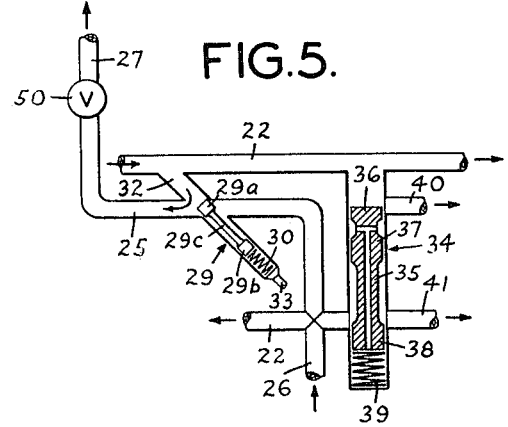

The valve head 38 also normally blocks flow of oil from the passage 26 to the conduit 41 by means of which oil is supplied to the piston cooling jets J. With this arrangement, when oil pressure on the downstream side of the oil cooler 21 is low due to retarded flow through the oil filter 20 and cooler 21, oil cannot flow directly from the pump to the piston cooling jets. After the engine has been in operation long enough to establish flow of oil through the oil filter 20 and the oil cooler 21 to the main gallery, a sufficient pressure will be developed to force the shuttle valve plug 35 downwardly to the position shown in FIGURE 4. In this position, oil cannot be discharged through the return passage 40, but the valve head 38 is displaced so that oil can flow directly from the passage 26 through the passage 41 to the piston cooling jets J. Upon further sufficient increase in pressure of the oil in the passage 22, the valve plug 35 is displaced further, as shown in FIGURE 5, so that excess pressure in the engine main gallery can be relieved through the passage 40 by returning oil to the sump while continued flow of oil to the piston cooling jets J is maintained through the conduit 41.

FIGURE 2 illustrates a typical valve unit for accomplishing the above functions.

In the valve unit shown in FIGURE 2, all or parts of the passages described above are included in the valve casing 45 which may take the form of a casting or a block of metal in which the passages are cast or formed by machining and the like. The passage 22 in the block 45 includes several branches extending into various portions of the block. Thus, the passage 22 includes a chamber 22a which is coupled to the conduit leading from the oil cooler, this coupling being indicated in dotted lines.

A laterally extending branch 22b of the passage 22 is connected with the main gallery illustrated in dotted lines therein. A downwardly extending branch 22c of the passage 22 is provided to apply the pressure in the passage 22 to the valve head 36 of the valve 34. The passage 26 leading from the oil pump to the oil filter includes an upwardly extending branch 26a which communicates with the oil filter 20 indicated in dotted lines therein. A downwardly extending branch 26b supplies oil under the control of the valve head 38 to the passage 41 leading to the oil cooling jets. The passage 40 is a chamber in the lower part of the valve housing by means of which lubricant is returned to the sump 18.

A tubular member 46 contains the passage 25 connected to the passage 26 through which lubricant is supplied to the turbocharger 15. The slide valve 29 is mounted in an inclined bore 47 which extends from the upper edge of the casing 45 at an angle to the passage 25 into communication with the passage 40 through the reduced section vent port 33. A shoulder 48 at the junction of the bore 47 and vent port 33 supports the spring 30 thereby normally urging the valve 29 upwardly into engagement with the plug 49 which closes the upper end of the bore 47. The passage 25 is provided with a check valve 50 at its outer end including a valve plug 51 biased against a seat 52 by means of a spring 53 which is retained in position by means of a split locking ring 54 received in a groove 55 in the valve casing. The casing is provided with a threaded coupling 56 to be connected to the conduit 27 leading to the turbocharger bearings. The purpose of the check valve 50 is to prevent reverse flow of lubricant from the bearing 38 through the passages 22 and 26 when the engine is stopped.

The valve 34 is located in the lower section of the valve casing 45 and includes a transverse bore 58 closed at its opposite ends by means of the threaded plugs 59 and 60. Mounted within the bore 58 is a fixed sleeve 61 having ports 62 and 63 on opposite sides thereof adjacent one end and ports 64 and 65 adjacent the opposite end of the sleeve. The valve plug 35 is slidably mounted in the sleeve 61 with the valve head 36 normally biased against a stop pin 66 which extends inwardly from the plug 59. In this position, the valve head 37 partially covers the ports 62 and 63. Also, in the normal position of the plug 35, the valve head 38 covers the ports 64 and 65 in the sleeve 61. As shown, the valve head 38 is hollow to receive one end of the spring 39 while the other end of the spring is received in a recess 67 in the closure plug 60. In order to avoid locking of the valve plug 35 by liquid leaking past the valve head 38 and being trapped between the valve head and the plug 60, a passage 68 having laterally extending branches 69 allows the liquid behind the valve head 38 to be vented to the passage 40.

As indicated above, pressure of sufficient magnitude in the passage 22 and its branch 22c against the valve head 36 displaces the valve plug 35 to the left as viewed in FIGURE 2, uncovering the ports 64 and 65 and allowing liquid to flow from the passage 26 through its branch 26b into the passage 41 which supplies liquid to the piston cooling jets. Further displacement of the valve 35 to the left will connect the passage 22 through its branch 22c to the passage 40 to regulate the pressure in the passage 22 and the engine main gallery.

It will be understood, of course, that the valve unit is susceptible to considerable modification and can be composed of separate casings for the valve 34 and the valve 29 which are connected by conduits with each other and the oil cooler and oil filter, the piston cooling jets and the main lubrication gallery in the manner generally described above and illustrated in FIGURES 3 to 5.

In view of variations possible in the construction and arrangement of the valve unit and the lubricating system, it will be understood that the specific embodiment of the system described herein is illustrative and that the invention is limited only as defined in the following claims.

We claim:
1. A lubrication system for internal combustion engines having reciprocating pistons, a crankshaft, connecting rods connecting said pistons to said crankshaft, bearings for said crankshaft and connecting rods, and a crankcase housing said crankshaft and crankshaft bearings, said system comprising an oil sump in said crankcase, a gellery for supplying oil to said bearings, a pump for supplying oil from said sump to said gallery, piston cooling jets in said crankcase for directing oil against said pistons to cool them, a conduit connecting said pump to said jets, a valve in said conduit, means normally biasing said valve to a closed position preventing flow of oil from said pump to said jets, and means responsive to a predetermined oil pressure in said gallery for moving said valve to an open position allowing oil to flow from said pump through said conduit to said jets.

2. The system set forth in claim 1 comprising an oil filter interposed between said pump and said gallery for filtering oil supplied by said pump to said gallery.

3. The system set forth in claim 2 in which said valve comprises a valve casing having a first port adjacent to one end thereof communicating with said gallery, opposed ports in said valve casing spaced lengthwise of said casing from said one port and communicating with said pump and said jets respectively, a slide valve plug in said casing, a first valve head on said plug adjacent to said one end of said casing and responsive to pressure of oil in said gallery for moving said valve plug from a first position to a second position and a second valve head on said plug interposed between said opposed ports when said valve plug is in said one position to prevent flow of oil therebetween and displaced from between said opposed ports when said plug is in said second position for flow of oil through said opposed ports, said biasing means continuously urging said valve plug toward said first position.

4. The system set forth in claim 2 in which said valve comprises a valve casing having a first port adjacent to one end thereof communicating with said gallery, opposed ports in said valve casing spaced lengthwise of said casing from said one port and communicating with said pump and said jets respectively, a slide valve plug in said casing, a first valve head on said plug adjacent to said one end of said casing and responsive to pressure of oil in said gallery for moving said valve plug from a first position to a second position, a second valve head on said plug interposed between said opposed ports when said valve plug is in said first position to prevent flow of oil therebetween and displaced from between said opposed ports when said plug is in said second position for flow of oil through said opposed ports, said biasing means continuously urging said valve plug toward said first position, and an oil return port in said casing between said first port and said opposed ports and communicating with said sump, said first valve head being interposed between said first port and said return port in said first and second positions to prevent flow of oil from said gallery to said sump, said valve plug being displaceable by oil pressure in said gallery to a third position connecting said oil return port to said gallery, said second valve head being displaced from between said opposed ports in said third position.

5. The system set forth in claim 2 in which said valve comprises a valve casing having a first port adjacent to one end thereof communicating with said gallery, opposed ports in said valve casing spaced lengthwise of said casing from said one port and communicating with said pump and said jets respectively, a slide valve plug in said casing, a first valve head on said plug adjacent to said one end of said casing and responsive to pressure of oil in said gallery for moving said valve plug from a first position to a second position, a second valve head on said plug interposed between said opposed ports when said valve plug is in said first position to prevent flow of oil therebetween and displaced from between said opposed ports when said plug is in said second position for flow of oil through said opposed ports, said biasing means continuously urging said valve plug toward said first position, an oil return port in said casing between said first port and said opposed ports and communicating with said sump, said first valve head being interposed between said first port and said return port in said first and second positions to prevent flow of oil from said gallery to said sump, said valve plug being displaceable by oil pressure in said gallery to a third position connecting said oil return port to said gallery, said second valve head being displaced from between said opposed ports in said third position, and a third valve head on said valve plug interposed between and preventing flow of oil between said opposed ports and said return port in all positions of said valve plug in said casing.

References Cited

UNITED STATES PATENTS

| 1,816,020 | 7/1931 | Meyer | 137—28 |
| 2,012,613 | 8/1935 | Loeffler | 123—196 |
| 2,144,449 | 1/1939 | Church | 123—196 |
| 3,199,523 | 8/1965 | McEathron | 137—557 X |

FOREIGN PATENTS 365,647  12/1938  Italy.

LAVERNE D. GEIGER, Primary Examiner.

H. S. BELL, Assistant Examiner.

U.S. Cl. X.R.

92—156; 184—104